United States Patent [19]
Lilja et al.

[11] Patent Number: 5,722,512
[45] Date of Patent: Mar. 3, 1998

[54] JET AIRCRAFT ENGINE SHIPPING STAND

[75] Inventors: Gerald D. Lilja, Parker, Colo.; Frank Fowler, Gilford, Conn.; Robert F. Hatch, Aurora, Colo.

[73] Assignee: Stanley Aviation Corporation, Aurora, Colo.

[21] Appl. No.: 565,437

[22] Filed: Nov. 30, 1995

[51] Int. Cl.$^6$ ........................................................ B66B 9/16
[52] U.S. Cl. ...................................... 187/244; 410/44
[58] Field of Search .............................. 187/244, 240, 187/203; 410/44; 244/53 R, 54; 414/786; 248/559, 557, 563, 638

[56] References Cited

U.S. PATENT DOCUMENTS

| | | | |
|---|---|---|---|
| 2,594,586 | 4/1952 | Ries | 280/44 |
| 2,613,807 | 10/1952 | Higbee | 206/46 |
| 2,670,166 | 2/1954 | Applegate | 248/119 |
| 2,674,370 | 4/1954 | Iredell, III | 206/46 |
| 2,928,535 | 3/1960 | Simmons et al. | 206/46 |
| 2,982,395 | 5/1961 | Rados | 206/46 |
| 3,194,525 | 7/1965 | Webb | 248/119 |
| 3,211,299 | 10/1965 | Metzrath | 214/1 |
| 4,117,927 | 10/1978 | Gothsche | 206/319 |
| 4,371,299 | 2/1983 | Cain et al. | 410/44 |
| 4,461,455 | 7/1984 | Mills et al. | 254/3 R |
| 4,660,796 | 4/1987 | Garrec | 248/544 |
| 4,699,337 | 10/1987 | Lewis | 244/137.1 |
| 5,120,184 | 6/1992 | Gerawan | 414/495 |

FOREIGN PATENT DOCUMENTS 86302452.7  2/1986  European Pat. Off. .

OTHER PUBLICATIONS

Product Information Catalog by Advance Ground Systems Engineering Corp. of Anaheim, California; AM-2387 Cradle and AM-2388 Base; 23 Oct. 1990.

No. 1: Product information advertisement by applicant Re: Core Engine Module.

No. 2: Product information advertisement by applicant Re: various types of ground support equipment to secure and transport components of a jet aircraft.

No. 3: Product information advertisement by applicant Re: a cradle device for securing a component of a jet aircraft engine.

No. 4: Product information advertisement by applicant Re: a cradle device for securing components of a jet air aircraft engine.

No. 5: Product information advertisement by applicant Re: Engine Stand.

No. 6: Product information advertisement by applicant Re: Hydraulic Engine Stand.

No. 7: Relevant portions of a product information catalog by Advance Ground Systems Engineering Corporation of Anaheim, California (23 Oct. 1990).

*Primary Examiner*—Kenneth Noland
*Attorney, Agent, or Firm*—Fields & Johnson, P.C.

[57] ABSTRACT

The shipping stand includes a cradle assembly mounted upon a frame assembly to which a jet aircraft is securable. The frame assembly includes a plurality of wheels for locomotive capability. A plurality of shock absorbers are operatively engaged between the cradle assembly and frame assembly to provide adequate shock protection to a loaded jet aircraft engine when the shipping stand is configured in a truck transport mode. A plurality of lifting mechanisms selectively raise the cradle assembly to a predetermined height creating gaps between upper transport flanges and lower transport flanges. The gaps correspond to the height of spacers positionable between the flanges in the truck transport mode. To place the shipping stand in an air transport mode, the lifting mechanisms are activated, the spacers are removed from between the flanges and the cradle assembly is lowered to eliminate the gaps between the flanges. Each spacer includes indicia which indicate which mode the shipping stand is configured and further includes an air mode slot and a truck mode slot which cooperates with corresponding mode pins ensuring that the appropriate indicia is viewable when the shipping stand is configured in either the truck transport mode or the air transport mode.

23 Claims, 9 Drawing Sheets

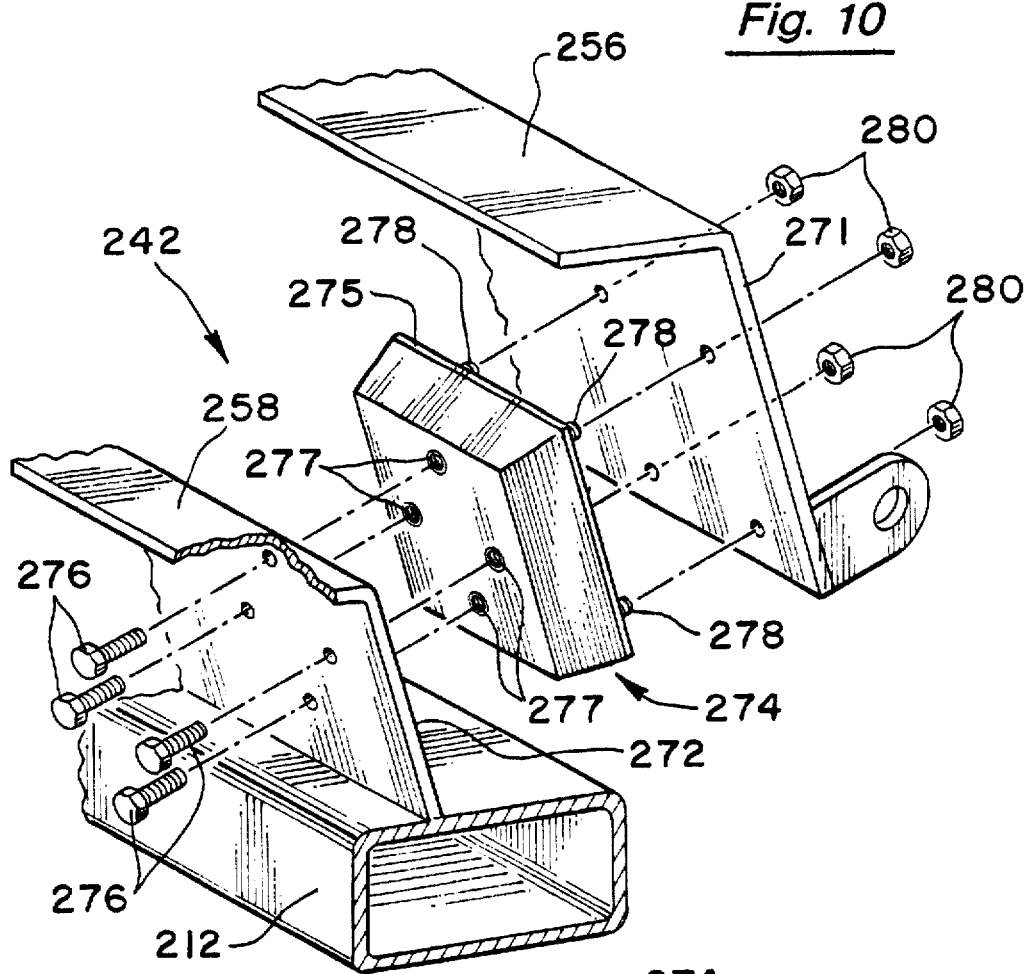
*Fig. 10*
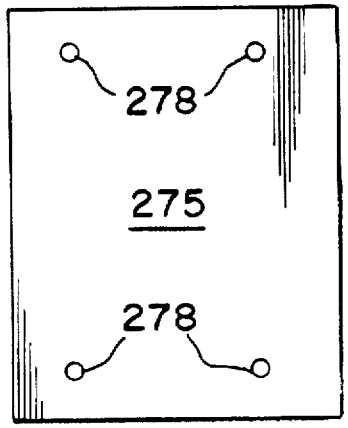
*Fig. 11c*
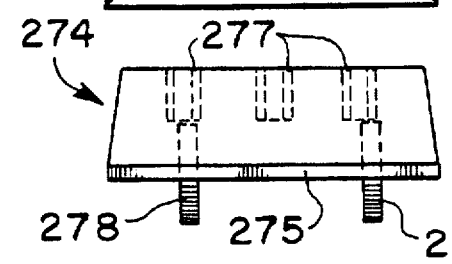
*Fig. 11b*
*Fig. 11d*

JET AIRCRAFT ENGINE SHIPPING STAND

TECHNICAL FIELD

This invention relates to a shipping stand providing a means of transport for an object and, more particularly, to a shipping stand for transport of a jet aircraft engine wherein the shipping stand may be placed in either a truck transport mode or an air transport mode.

BACKGROUND ART

In the commercial aircraft industry, a need has developed for the capability of transporting aircraft engine assemblies in order that these assemblies may be repaired or inspected. Jet aircraft engines are perhaps the most critical assembly of an aircraft wherein the engines must be continually inspected and maintained to a high level of repair. Periodically, it is necessary to remove these engines from the wing or fuselage of the aircraft so that the aircraft engine can undergo extensive repairs or overhauling.

Some prior art devices exist for securing and transporting a jet engine that has been removed from an aircraft. Typically, these prior art devices include a number of different configurations which releasably secure the jet aircraft engine and provide a means of transport so that the jet engine may be taken to the desired location for repair or inspection.

Although the prior art devices may be adequate for their intended purposes, one significant shortfall is that none of the prior art devices provide a shipping stand which may be configured for either the truck transport of a Boeing 777 jet engine or the air transport of that engine in a Boeing 747 aircraft. As of the date of this application, the only known commercial jet aircraft that may transport the jet aircraft engine of a Boeing 777 aircraft is the Boeing 747. This is due to the fact that the Boeing 747 has a much larger cargo door than most other commercial aircraft enabling it to receive in its cargo hold the entire jet aircraft engine of the Boeing 777 which includes a very large diameter fan section.

DISCLOSURE OF THE INVENTION

In the most broad disclosure of the invention, a shipping stand is disclosed which utilizes spacer elements which may be positioned in a truck transport mode wherein a plurality of shock absorbers are activated to provide shock absorbing support to a loaded aircraft engine, alternatively, the shipping stand may be positioned in an air transport mode wherein the spacers are stowed and the shock absorbers are deactivated. The spacers are positionable in either desired mode by the use of an integral hydraulic system which raises and lowers a cradle assembly which supports the mounted engine. The advantage of such a dual mode system is based on the need to transport a jet aircraft engine on land via a wheeled vehicle and/or on the cargo deck of a Boeing 747 or other jet aircraft for further destinations. In the truck transport mode, the shock absorbers are required to provide shock protection to the mounted jet aircraft engine from the impacts associated with road travel. Without such protection, the jet engine could be easily damaged during transport. However, in the air transport mode, the shock absorbers are not required. This is due to the fact that air transport is a much smoother means of transport wherein the natural flight of the aircraft generally provides adequate shock absorbing protection.

Conveniently, when the shipping stand is placed in the air transport mode, the height of an aircraft engine loaded thereon is lowered enabling the loaded aircraft engine to fit in the cargo door of a commercial aircraft such as a Boeing 747. More specifically, the dimensions of a Boeing 747 side cargo door provide only a one and one-half inch (1 ½") clearance when the fan section of a Boeing 777 jet aircraft engine is loaded through the cargo door into the cargo hold. Thus, it is necessary that the jet aircraft engine be precisely aligned with the cargo door so that the jet aircraft engine may be easily loaded. With the dual mode capability the present invention, the shipping stand may be lowered from the truck transport to the air transport mode at an ideal height which enables the jet aircraft engine to be directly loaded through the cargo door into the cargo hold while the jet aircraft engine remains secured to the shipping stand.

The structure of the shipping stand includes a frame assembly including a plurality of frame members which provide adequate support to a cradle assembly which cradles or secures a jet aircraft engine. Mounted to the frame assembly are wheels which enable the shipping stand to be pulled by a vehicle. The plurality of shock absorbers are operatively engaged between the frame assembly and cradle assembly to provide adequate shock protection to the jet aircraft engine when the shipping stand is configured in the truck transport mode. To enable the shipping stand to be selectively placed in either the truck transport or air transport mode, lifting mechanisms are provided to lower or raise the cradle assembly corresponding to the desired mode. In the truck transport mode, the lifting mechanisms raise the cradle assembly to a predetermined height which creates gaps between upper transport flanges and lower transport flanges. These gaps correspond to the height of spacers which are positionable between the upper and lower flanges. Once the spacers are positioned between the flanges, the lifting mechanisms are deactivated which causes the shock absorbers to bear the weight of the loaded aircraft engine. If it is desired to load a jet aircraft engine onto an aircraft, the shipping stand may be placed in the air transport mode. This is achieved by activating the lift mechanisms, removing the spacers between the transport flanges and then lowering the cradle assembly so that the gaps between the transport flanges are eliminated. In the air transport mode, the spacers are stowed on the shipping stand by use of storage support flanges positioned adjacent the transport flanges.

Each spacer includes indicia which indicates which mode the shipping stand is configured. More specifically, each spacer includes a plurality of mode slots which cooperate with corresponding mode pins formed on the upper and lower transport flanges. The cooperation of the mode slots with the mode pins results in the appropriate indicia appearing on the side of the spacer exposed to viewing. Thus, the indicia serves to ensure that an operator of the shipping stand does not inadvertently place the shipping stand in the inappropriate mode when transporting the jet aircraft engine.

Although the shipping stand is described as having particular utility with respect to transport of a Boeing 777 jet aircraft engine by use of a Boeing 747 aircraft, it will be understood that the present invention is intended for many other uses as it is easily adaptable to accommodate the transport of many different types of jet aircraft engines for truck transport and air transport on numerous different types of aircraft. The height of the cradle assembly in the truck transport mode and the air transport mode may be altered so that a particular jet aircraft engine may be loaded directly onto a specific type of aircraft. For example, for aircraft other than a Boeing 747, the cradle assembly may be raised or lowered in the truck transport mode by altering the specific construction of the frame assembly or cradle assembly. Additionally, any number of different sized spacers may be used to enable a smooth transition from the truck transport mode to the air transport mode and vice versa. Accordingly, the ranges of the lifting mechanisms may also be altered to accommodate the specific height necessary for transition between the two modes.

With the shipping stand just described, it is possible to provide a dual mode of transport for a jet aircraft engine loaded thereon. The shipping stand therefore enables direct loading of an aircraft engine onto an aircraft by changing the configuration from a truck transport to an air transport mode and, conversely, enables a smooth transition from an air transport mode back to a truck transport mode once the jet aircraft engine has arrived at its destination. Accordingly, the shipping stand prevents having to use complicated winch assemblies or other means to load and unload the jet aircraft engine onto and from the aircraft. Additionally, because of the smooth transition between truck and air transport, the chances of damaging a jet aircraft engine during transport is greatly reduced. Furthermore, the process of transporting a jet aircraft engine can be accomplished in a much more cost effective and efficient manner by utilizing the shipping stand of this invention.

Additional advantages of this invention will become apparent from the description that follows, taken in conjunction with the accompanying drawings.

BRIEF DESCRIPTION OF DRAWINGS

FIG. 10 is an enlarged exploded perspective fragmentary view of a shock absorber positionable between the frame assembly and cradle assembly of the shipping stand of this invention;

FIG. 11a is a front view of the shock absorber, illustrated in FIG. 10;

FIG. 11b is a side view of the shock absorber;

FIG. 11c is a rear view of the shock absorber; and

FIG. 11d is a side elevation of the shock absorber.

BEST MODE FOR CARRYING OUT THE INVENTION

Figure 1:
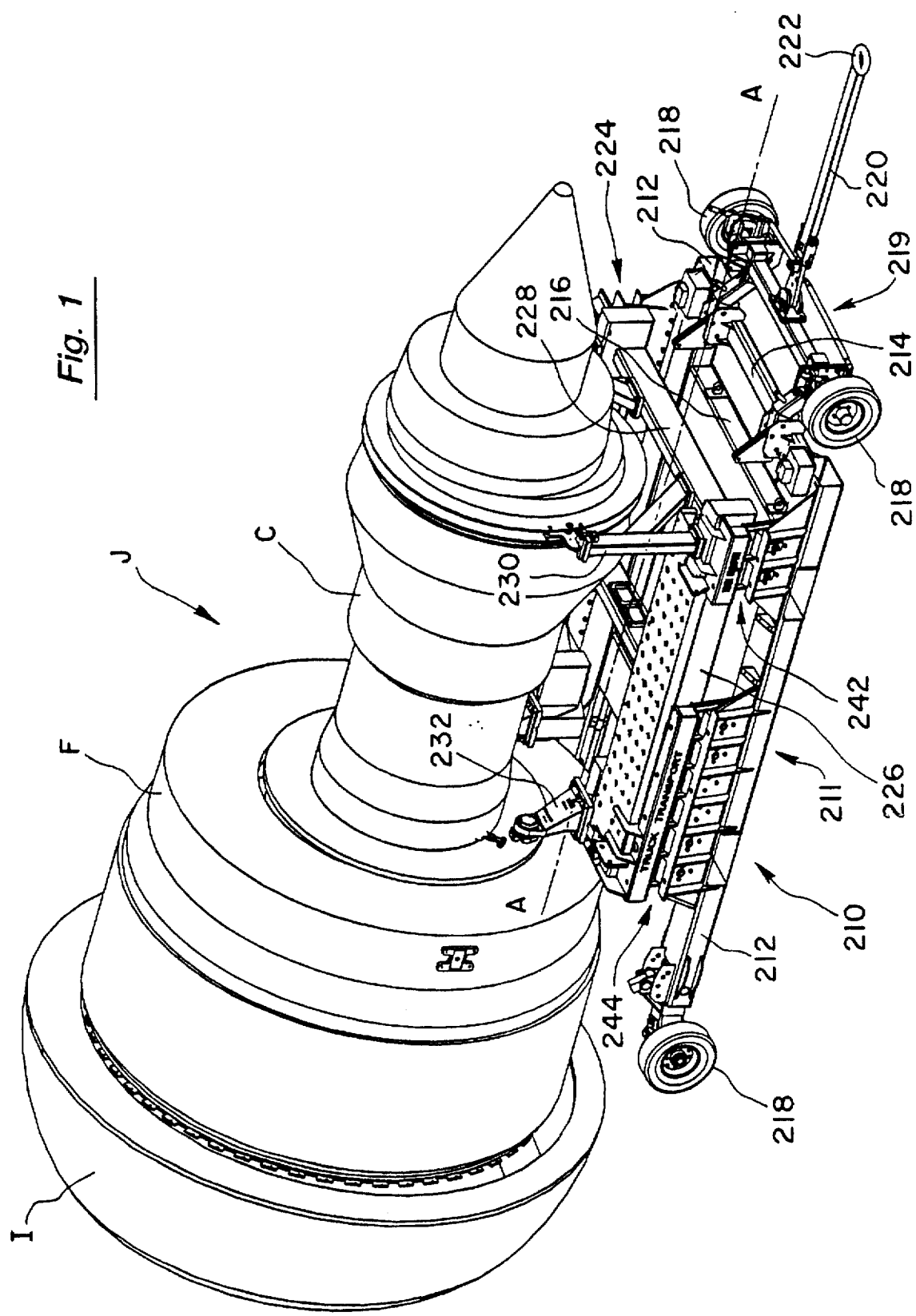
FIG. 1 is a perspective view of a preferred embodiment of the shipping stand of this invention illustrating a jet aircraft engine mounted on the shipping stand while the shipping stand is configured in the truck transport mode.

In accordance with the jet aircraft engine shipping stand 210 of this invention, as shown in FIG. 1, the shipping stand 210 includes a frame assembly 211 having a pair of laterally spaced and longitudinally extending frame members 212 connected by at least one cross frame member 214 and at least one stabilizing member 216. Each of the members of the frame assembly 211 may be constructed of heavy gauge steel channel or bar which provides adequate support to a jet aircraft engine loaded thereon. Operatively engaged with the frame assembly 211 are wheel assemblies 218. As understood by those skilled in the art, wheel assemblies 218 may be engaged with the frame assembly 211 in a desired manner such that the wheels provide the necessary locomotive capability for wheeled transport. As shown in FIG. 1, the rear wheels are mounted to a steering assembly 219 which is directly mounted to cross-frame member 214. The front wheels are mounted directly to a front portion of longitudinal members 212. Conveniently, a goose neck extension 220 with towing pintle 222 is attached to the steering assembly 219 so that a wheeled vehicle may tow the shipping stand 210.

Figure 2:
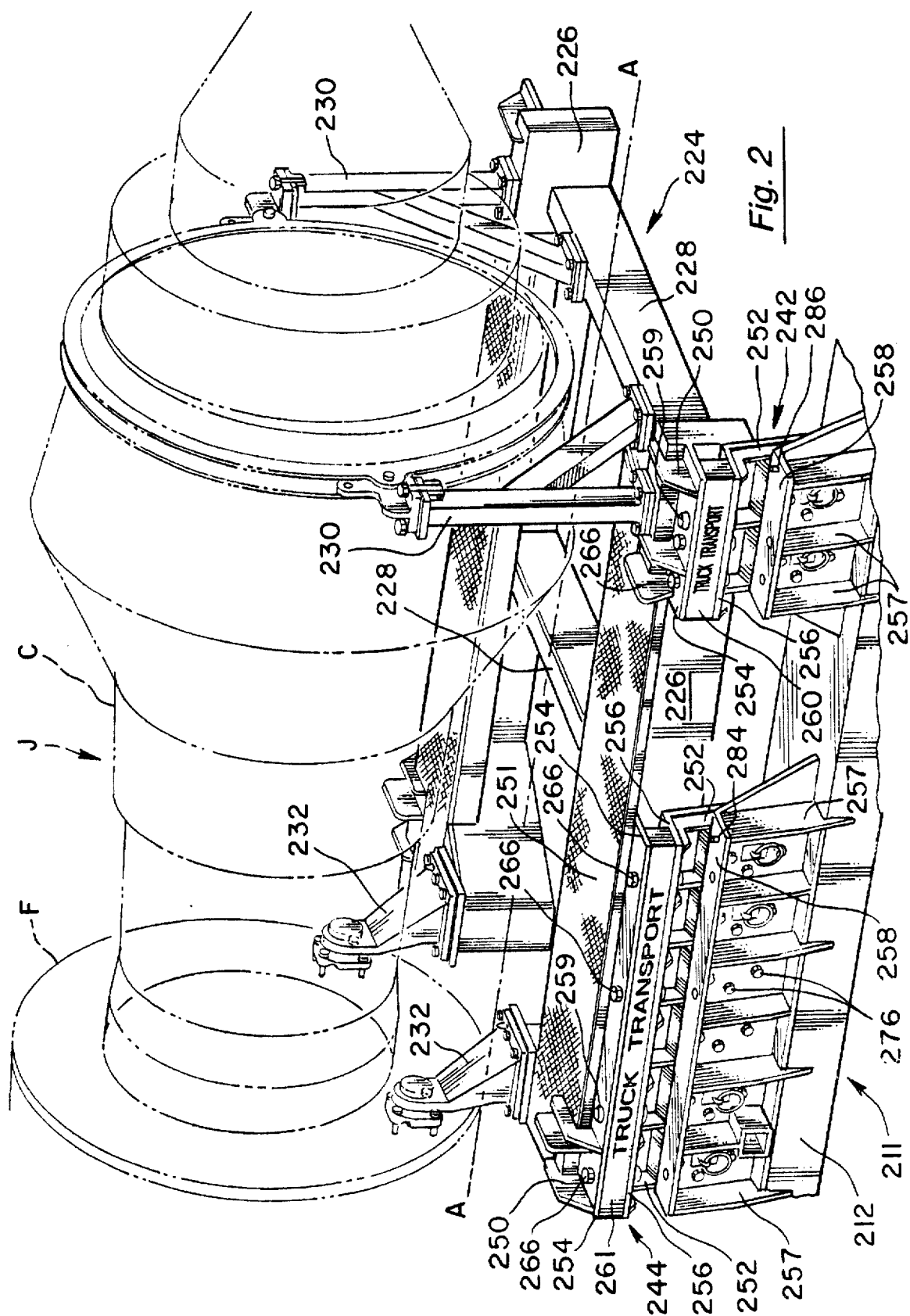
FIG. 2 is an enlarged fragmentary perspective view of the shipping stand of this invention as shown in FIG. 1.
Figure 3:
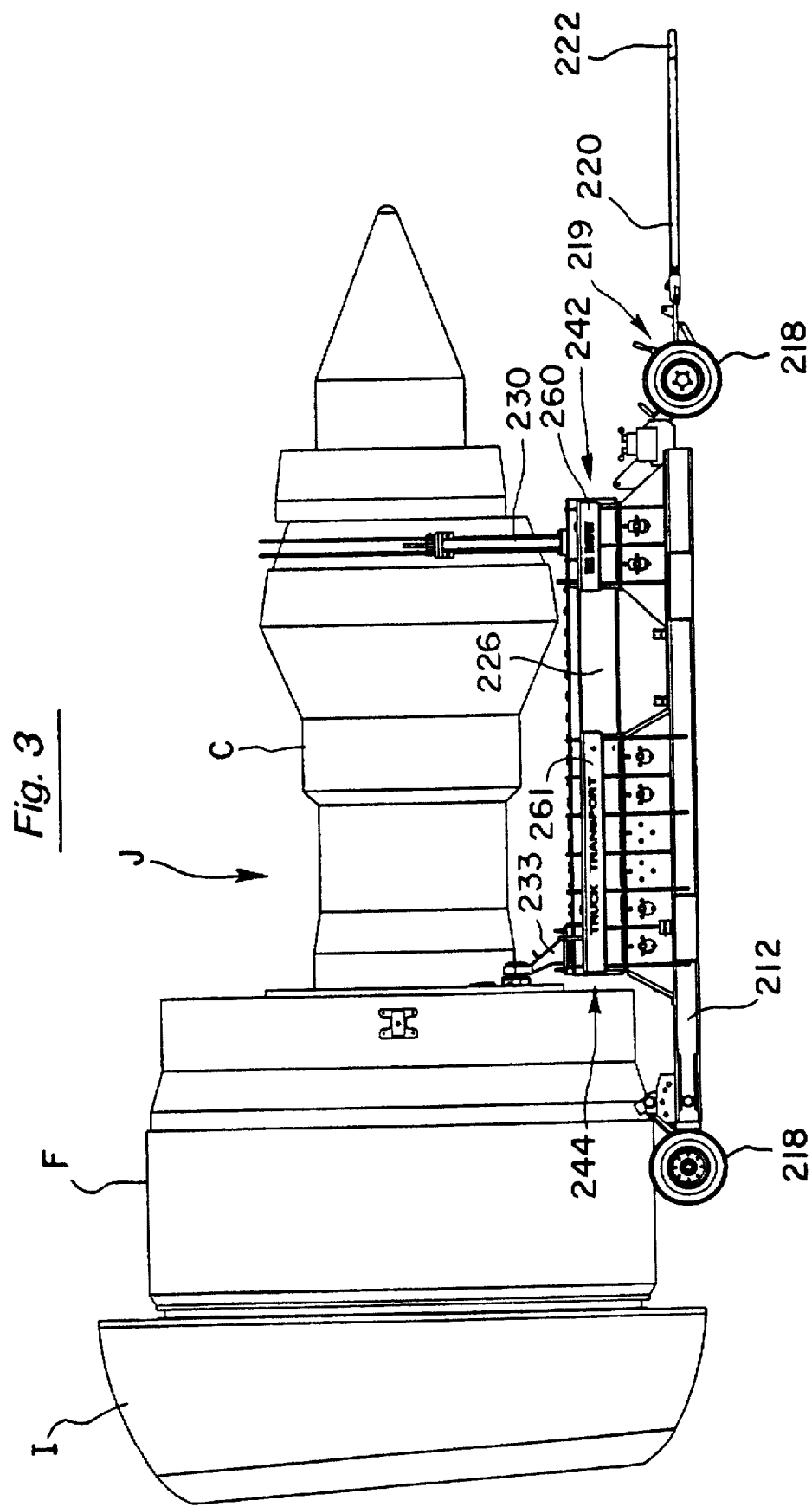
FIG. 3 is a side elevation of the shipping stand of this invention when the shipping stand is configured in the truck transport mode.

As best seen in FIG. 2, mounted on the frame assembly 211 is a cradle assembly 224. The cradle assembly 224 includes a pair of longitudinal supports 226 which are interconnected by a pair of transverse supports 228. Supports 226 and 228 substantially conform in length to longitudinal frame members 212 and cross frame members 214. Mounted on the rearward corners of cradle assembly 224 are stanchions 230. Stanchions 230 serve to secure the core section C of the jet aircraft engine J. A pair of engine mounts 232 are mounted on the forward corners of the cradle assembly 224. Engine mounts 232 are used to secure the inlet cowl I of jet aircraft engine J to the cradle assembly 224.

A pair of aft mode transport assemblies 242 and a pair of forward mode transport assemblies 244 are integral with the cradle assembly 224 enabling the shipping stand 210 to be placed in either a truck transport mode or air transport mode. Although a pair of forward and aft mode transport assemblies are shown in the preferred embodiment, it will be understood by those skilled in the art that a single mode transport assembly may be provided on each side of the shipping stand, or more than two pair of mode transport assemblies may be used depending upon the type of jet aircraft engine to be transported. Axis A—A is provided to illustrate the symmetry of the shipping stand along its longitudinal axis. That is, the structure of the shipping stand includes two identical sides which are bisected by the longitudinal axis A—A.

As shown in FIG. 2, aft mode assembly 242 and forward mode assembly 244 each include a plurality of stabilizing transport webs 250 which are attached in a perpendicular manner as by welding to longitudinal support 226. Support decking 251 is secured to longitudinal support 226 in order to provide clear walking space on cradle assembly 224. Each assembly 242 and 244 includes an upper transport flange 254 which extends along a specified length of longitudinal support 226 and is attached as by welding to longitudinal support 226 and to the free ends of upper stabilizing webs 250. Disposed below webs 250 are a plurality of lower stabilizing webs 252. As will be discussed below, lower stabilizing webs 252 attach to corresponding transport brackets 271, as best seen in FIGS. 18a and 18b. Each assembly 242 and 244 also includes lower transport flange 256 which extends along a specified length of support 226 and is attached as by welding to the free ends of lower stabilizing webs 252. Transport flanges 254 and 256 are arranged in parallel relationship to accommodate placement of spacers 260 and 261. When the shipping stand of this invention is placed in the truck transport mode, gaps exist between upper flanges 254 and lower flanges 256. Conveniently, these gaps correspond to the height of aft spacers 260 and forward spacers 261 which enables spacers 260 and 261 to be placed in the gaps. As shown in FIG. 14, aft assembly 242 and forward mode assembly 244 differ in the number of stabilizing webs 250 and 252, and corresponding lengths of stabilizing flanges 254 and 256.

Figure 7A:
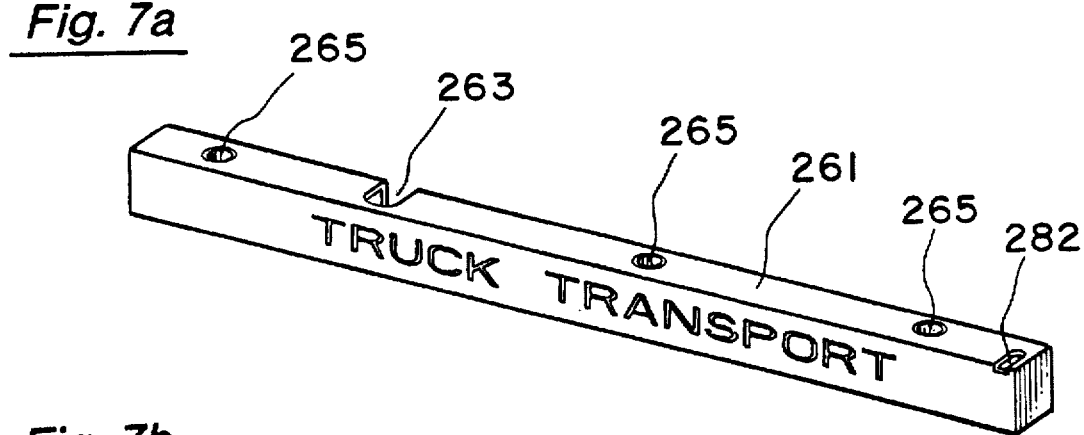
FIG. 7a is a perspective view of a forward spacer illustrating the truck transport indicia.
Figure 7B:
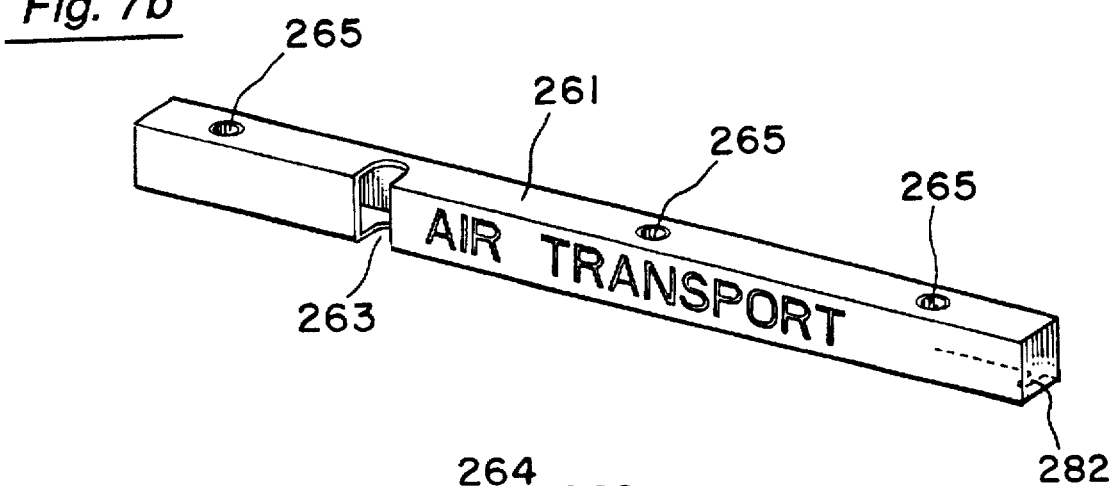
FIG. 7b is a perspective view of a forward spacer illustrating the air transport indicia.
Figure 8A:
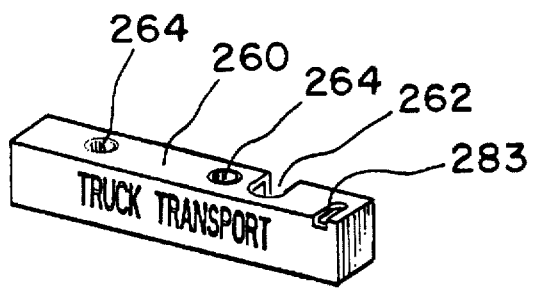
FIG. 8a is a perspective view of an aft spacer illustrating the truck transport indicia.
Figure 8B:
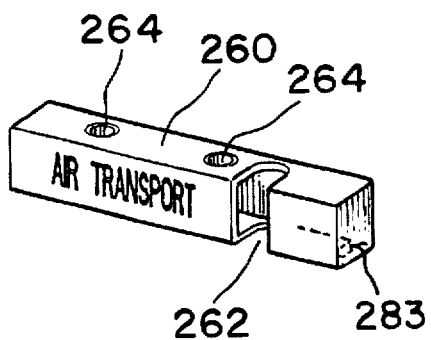
FIG. 8b is a perspective view of an aft spacer illustrating the air transport indicia.
Figure 9A:
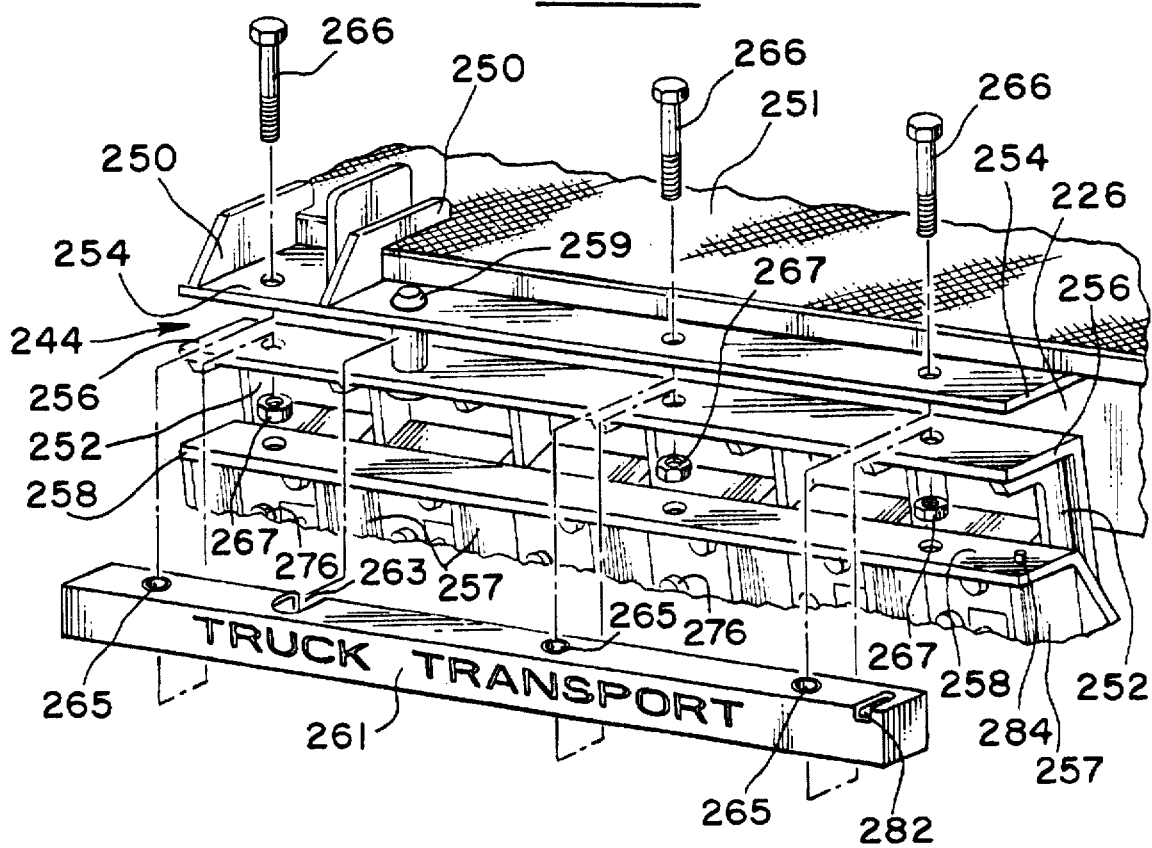
FIG. 9a is an enlarged partially exploded fragmentary perspective view of a forward spacer that is engageable with the cradle assembly of the shipping stand configured in the truck transport mode.
Figure 9B:
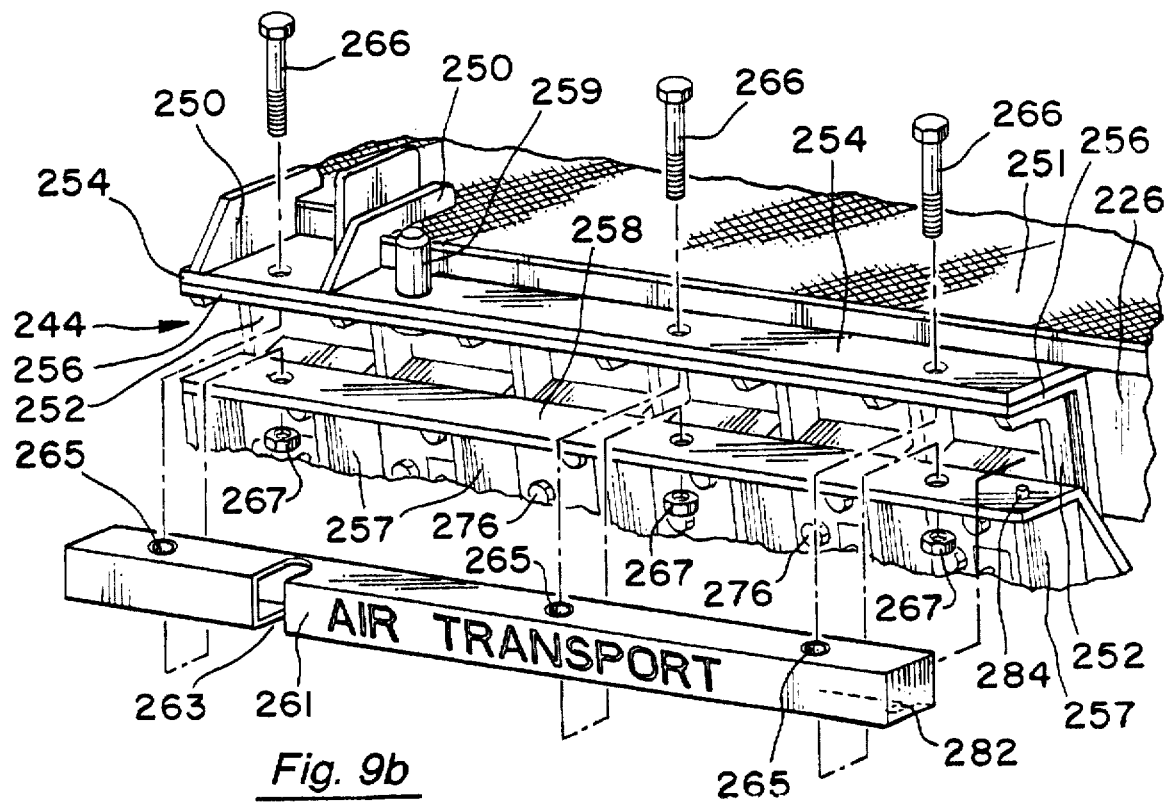
FIG. 9b is an enlarged partially exploded fragmentary perspective view of a front spacer that is engageable with the cradle assembly of the shipping stand configured in the air transport mode.

As best seen in FIGS. 7a and 7b, forward spacer 261 is of a rectangular cross section and includes a truck mode transport slot 263 formed on an exterior edge thereof. Forward spacer 261 further includes an air mode transport slot 282. A plurality of alignment holes 265 are formed through the forward spacer and which cooperate with a corresponding plurality of spacer retaining bolts 266, as shown in FIGS. 9a and 9b, as will be discussed further below. Similarly, as shown in FIGS. 8a and 8b, aft spacer 260 includes a truck mode slot 262, a plurality of alignment holes 264, and an air mode transport slot 283.

Figure 4:
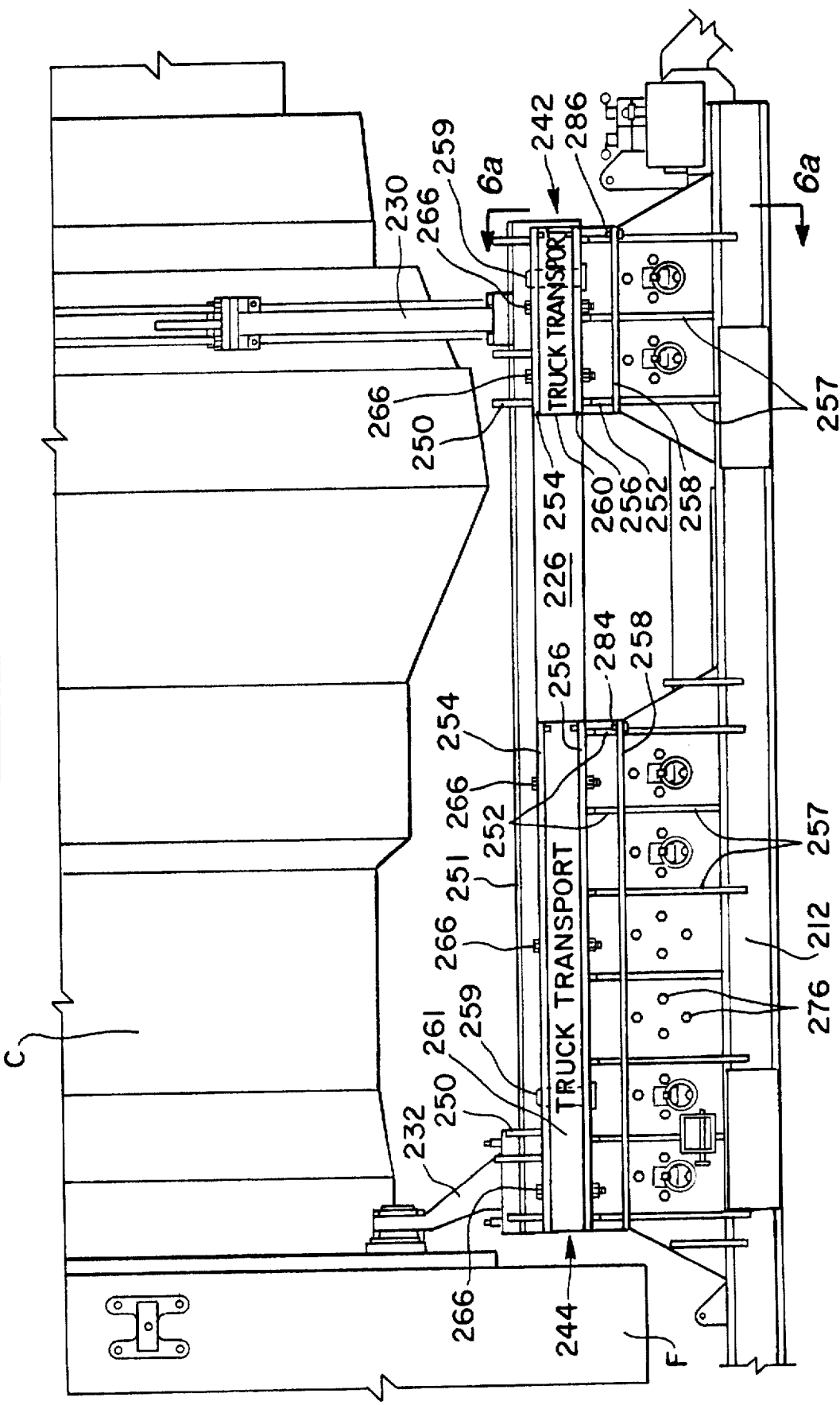
FIG. 4 is an enlarged fragmentary side elevation of the shipping stand of this invention, as shown in FIG. 3, when the shipping stand is configured in the truck transport mode.
Figure 5:
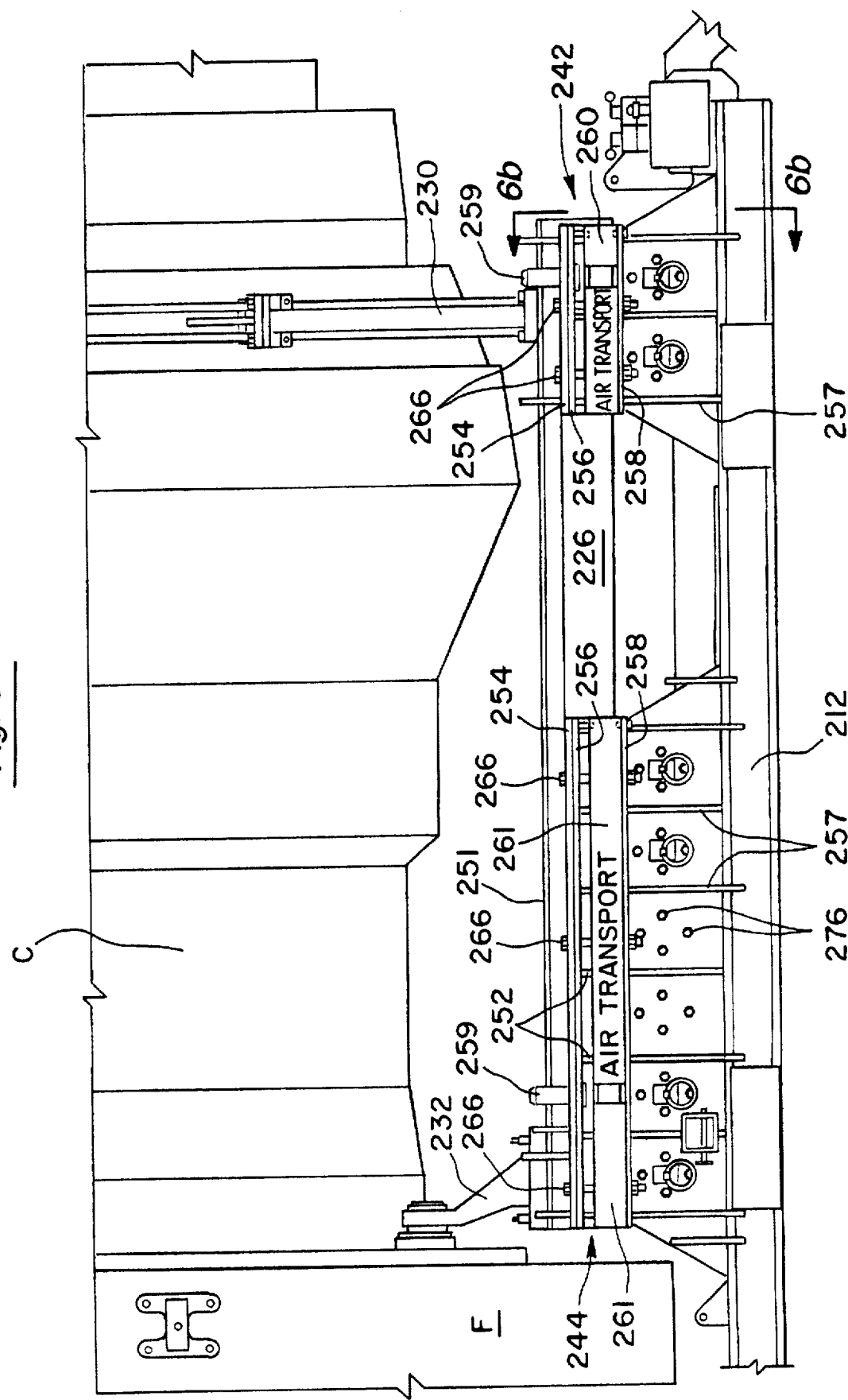
FIG. 5 is an enlarged fragmentary side elevation as shown in FIG. 3, illustrating the shipping stand configured in the air transport mode.

As best seen in FIG. 9a, when the shipping stand 210 is configured in the truck transport mode, each spacer 261 is placed in the gap between corresponding upper transport flange 254 and lower transport flange 256 so that alignment holes 265 are aligned for receiving corresponding spacer retainer bolts 266. Spacer retainer nuts 267 engage with the retaining bolts to secure each spacer 261 in position. In the truck transport mode, mode pins 259 cooperate with mode slots 263. Truck mode pins 259 are secured at their lower ends to flanges 256 and are insertable at their upper ends through flanges 254. Because of the positioning of the truck transport indicia with respect to slots 263, only the truck transport indicia can be exposed when the spacers are inserted between flanges 254 and 256. Accordingly, the arrangement of pins 259 with respect to slots 263 serve as safety measures to ensure that the spacers 261 are properly positioned. When the shipping stand is configured in the air transport mode, the gaps between flanges 254 and 256 are eliminated causing pin 259 to be pushed upwardly through flanges 254. Spacers 261 may be then stored in the gaps between lower transport flanges 256 and storage support flanges 258, and secured by means of bolts 266 and nuts 267. To ensure that the truck transport indicia is not inadvertently exposed when the shipping stand is configured in the air transport mode, air transport slots 282 cooperate with air transport retaining pins 284 to allow spacers 261 to be stored in the gaps between flanges 256 and 258. Aft mode assemblies 242 utilize aft spacers 260 in the same manner as forward mode assemblies 244 utilize forward spacers 261. That is, the positioning of mode slots 262 with respect to corresponding pins 259 ensures that an operator of the shipping stand may view the proper indicia to determine which mode the shipping stand is configured. Similarly, aft spacers 260 each have an air transport slot 283 that cooperates with corresponding retaining pin 286, shown in FIGS. 2 and 4, to ensure the air transport indicia is properly displayed.

Figure 6B:
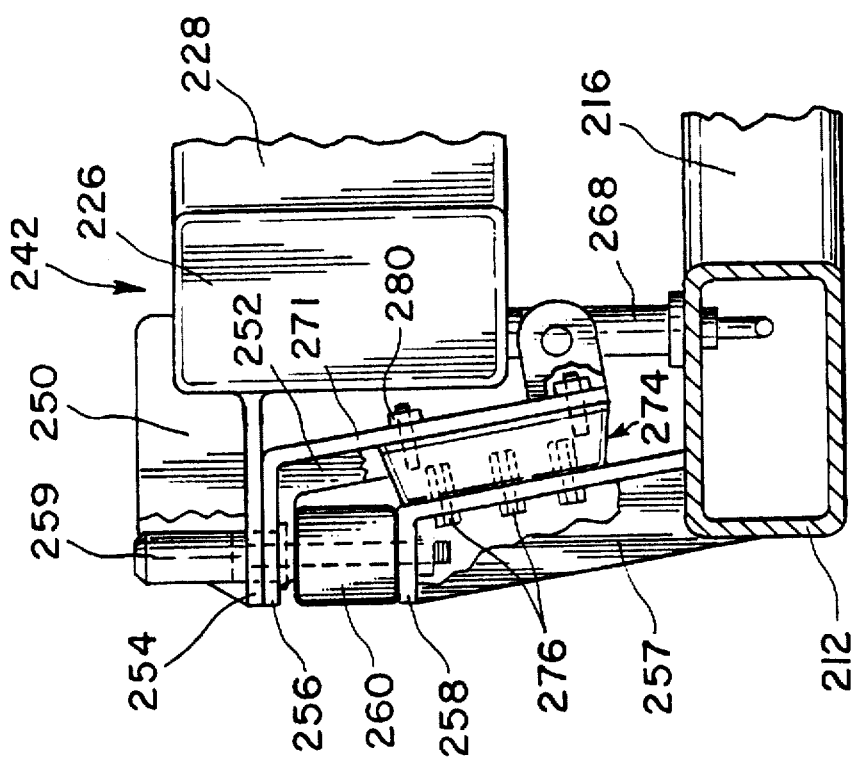
FIG. 6b is an enlarged fragmentary vertical section taken along line 6b of FIG. 5.
Figure 6A:
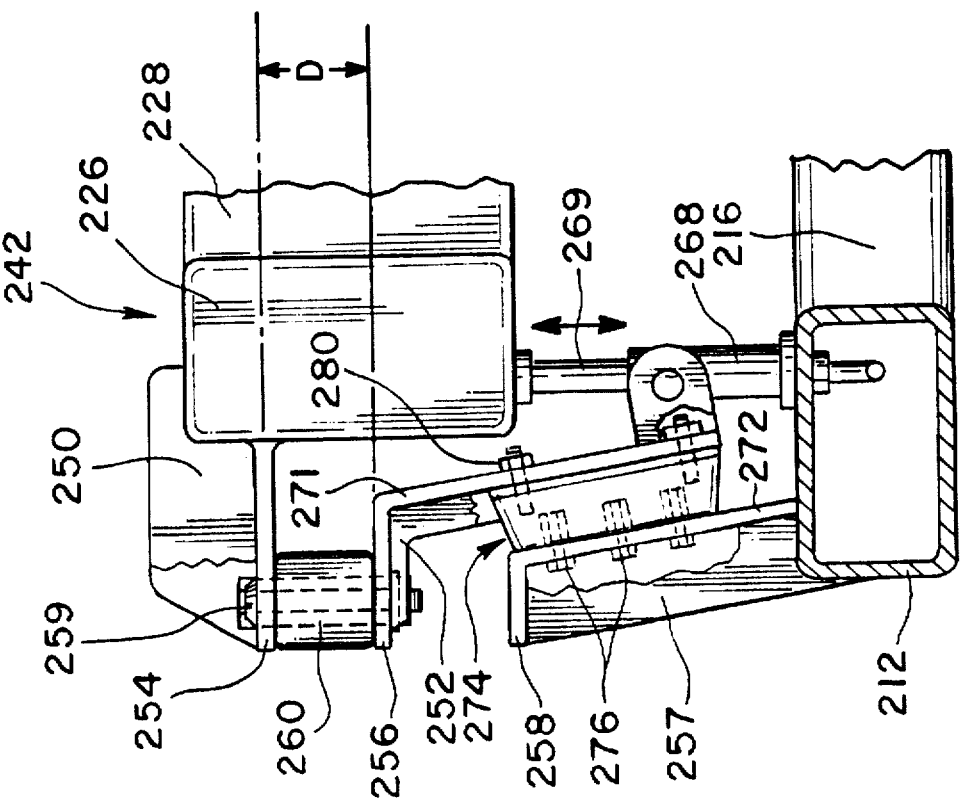
FIG. 6a is an enlarged fragmentary vertical section taken along line 6a of FIG. 4.

As best seen in FIGS. 6a and 6b, the storage support flanges 258 are integral with storage support brackets 272. Storage support webs 257 are connected to brackets 272 and member 212 to provide the necessary support to flanges 258. As shown in FIG. 6a, when the shipping stand 210 is configured in the truck transport mode, spacers 260 are placed between upper transport flanges 254 and lower transport flanges 256. In this mode, the load of the jet aircraft engine is placed upon spacers 260 and is transmitted through transport brackets 271 to shock absorbers 274. Thus, the desired shock support is provided when the shipping stand is in the truck transport mode by transferring the load of the jet aircraft engine onto shock absorbers 274. As shown in FIG. 6b, when the shipping stand is configured in the air transport mode, the cradle assembly 224 is lowered by a distance D and the gaps between flanges 254 and 256 are eliminated causing the load of the jet aircraft engine to be directly transmitted from the cradle assembly to the frame assembly. That is, since no load is placed on shock absorbers 274, the load of the aircraft engine receives no shock absorbing protection therefrom.

As further illustrated in FIGS. 6a and 6b, pistons 269 are concentrically mounted within cylinders 268 to form common hydraulic lift devices or lifting mechanisms. Conveniently, cradle assembly 224 may be lifted by means of pistons 269 which contact the lower surfaces of longitudinal supports 226 and which are activated by the control of hydraulic fluid from a hydraulic pump (not shown). To configure the shipping stand in the truck transport mode, the cradle assembly 224 is raised to a specified height which enables spacers 260 and 261 to be inserted in the gaps between flanges 254 and 256. Once the spacers are securely in place, hydraulic pressure within cylinders 268 and pistons 269 are relieved which transfers the load of the loaded jet aircraft engine onto the respective shock absorbers 274. When it is desired to lower the cradle assembly 224 for placing the shipping stand 210 in the air transport mode, the lifting mechanisms are activated, spacers 260 and 261 are removed, and cradle assembly 224 is lowered by controlling the movement of pistons 269 in a reverse direction. Although the lifting mechanisms of this invention are described as hydraulic lifting devices, it will be understood that other suitable lifting mechanisms may be used such as mechanical scissor jacks or the like.

As seen in FIGS. 10 and 11, shock absorbers 242 achieve the function of shock absorption by positioning them between the frame assembly 211 and cradle assembly 224. Specifically, each shock absorber 274 operatively connects storage support bracket 272 of the frame assembly 211 to transport bracket 271 of the cradle assembly 224. A plurality of support bracket bolts 276 may be inserted through storage support bracket 272 and received in threaded wells 277 located on one side of each shock absorber 274. On the opposite side of each shock absorber 274, a shock absorber back plate 275 is provided which includes a plurality of shock absorber bolts 278 protruding therefrom. Bolts 278 pass through corresponding holes in each transport bracket 271 and are secured as by means of transport bracket nuts 280. Although a specific arrangement of support bracket bolts and shock absorber bolts are shown, it will be understood that the invention claimed herein is not limited to any specific arrangement therein.

This invention has been described in detail with reference to a particular embodiment thereof, but it will be understood that various other modifications can be effected within the spirit and scope of this invention.

I claim:

1. An improved jet aircraft engine shipping stand for shipping a jet aircraft engine mounted thereon in either a truck transport mode or an air transport mode, said shipping stand comprising:

a frame for supporting the aircraft engine;

a plurality of wheels mounted to said frame for providing locomotive capability to said shipping stand;

a cradle mounted on said frame, said cradle providing selective shock absorbing support between the aircraft engine and said frame, said cradle including at least one spacer that is selectively engaged therewith for configuring said shipping stand in either the truck transport mode or the air transport mode.

2. The shipping stand, as claimed in claim 1, further including:

a lifting mechanism mounted on said frame providing selective control for placement of said shipping stand in either the truck transport mode or the air transport mode; and a shock absorber operatively connecting said cradle to said frame for providing absorption of shock when said shipping stand is configured in the truck transport mode.

3. The shipping stand, as claimed in claim 1, further including:

at least one mode pin connected to said cradle to align said spacer for selective configuration of said shipping stand in the truck transport mode or the air transport mode.

4. The shipping stand, as claimed in claim 3, wherein said spacer further includes:

at least one mode slot formed on an exterior surface thereof and engageable with said at least one mode pin.

5. The shipping stand, as claimed in claim 1, wherein said spacer further includes:

indicia indicating whether the shipping stand is in the truck transport mode or air transport mode.

6. The shipping stand, as claimed in claim 1, wherein said cradle further includes:

a first pair of surfaces integral with said cradle that are selectively positionable to form a gap, said spacer being insertable in said gap when said shipping stand is configured in the truck transport mode.

7. The shipping stand, as claimed in claim 1, wherein said cradle further includes:

a second surface integral with said cradle for storing said spacer thereon when said shipping stand is configured in the air transport mode.

8. An apparatus providing securable support for a dual mode of transport of an object loaded thereon, said apparatus comprising:

a frame for supporting and securing the object loaded thereon;

a pair of surfaces integral with said frame and selectively positionable between a first position for truck transport and a second position for air transport;

a spacer insertable between said pair of surfaces when said surfaces are positioned in said first position; and a shock absorber operatively engaged with said pair of surfaces for providing shock absorption to the object when said pair of surfaces are in the first position.

9. An apparatus, as claimed in claim 8, further including:

a lifting mechanism operatively engaged with said shock absorber for selectively positioning said pair of surfaces in either the first or second positions.

10. An apparatus, as claimed in claim 8, wherein:

said pair of surfaces are a pair of flanges.

11. An apparatus, as claimed in claim 8, further including:

a mode pin cooperating with one of said pair of surfaces for aligning said spacer.

12. An apparatus, as claimed in claim 11, wherein said spacer further includes:

a slot formed on an exterior surface thereof and engageable with said mode pin for aligning said spacer when said pair of surfaces are positioned in the first or second positions.

13. An apparatus, as claimed in claim 8, further including:

indicia integral with said spacer indicating whether said apparatus is in the first or second position.

14. An apparatus, as claimed in claim 8, further including:

a storage support surface integral with said frame and juxtaposed to said pair of surfaces for storing said spacer on said apparatus when said pair of surfaces are positioned in the second position.

15. A method of providing a selective dual mode of transport for an aircraft engine, said method comprising the steps of:

providing a shipping stand including a cradle mechanism having a pair of spaced adjustable surfaces and a spacer positionable therebetween, said shipping stand being usable for supporting and securing a jet aircraft engine;

placing the cradle mechanism in a truck transport mode wherein the spacer is positioned therebetween the pair of surfaces to activate a shock absorber;

securing a jet aircraft engine to the cradle mechanism;

transporting the jet aircraft engine to a first desired location by pulling the shipping stand with a vehicle;

placing the cradle in an air transport mode wherein the spacer is disengaged with the pair of surfaces to deactivate the shock absorber;

loading the shipping stand with secured jet aircraft engine onto an aircraft;

transporting the jet aircraft engine to a second desired location via the aircraft.

16. A method, as claimed in claim 15, further including the step of:

providing indicia on the spacer as to the mode of transport being utilized.

17. A method, as claimed in claim 15, wherein the placing the cradle assembly in an air transport mode step further includes:

adjusting the height of the shipping stand a predetermined amount enabling the shipping stand with secured jet aircraft engine to be configured for direct loading onto the aircraft.

18. An improved jet aircraft engine shipping stand for shipping a jet aircraft engine loaded thereon in either a truck transport mode or an air transport mode, said shipping stand comprising:

means for supporting a jet aircraft engine loaded thereon including means for providing locomotive capability to said shipping stand;

means mounted on said supporting means for securing the jet aircraft engine to said supporting means, said securing means including at least one means for absorbing shock activatable when said shipping stand is positioned in the truck transport mode, said shock absorbing means providing selective shock absorbing support to the jet aircraft engine loaded on said supporting means;

means integral with said securing means for creating an adjustable gap to selectively place said shipping stand in either the truck transport or the air transport mode; and means for maintaining said gap selectively positionable adjacent said creating means wherein the selective positioning of said maintaining means enables said shipping stand to be configured to transport the jet aircraft engine in either the truck transport mode or the air transport mode.

19. The shipping stand, as claimed in claim 18, wherein said creating means further includes:

means mounted to said supporting means for raising or lowering said securing means for selective placement of said shipping stand in either the truck transport mode or the air transport mode.

20. The shipping stand, as claimed in claim 18, further including:

means protruding from said creating means for aligning said maintaining means between said creating means.

21. The shipping stand, as claimed in claim 18, wherein said securing means further includes:

means for storing said maintaining means on said shipping stand when said shipping stand is configured in the air transport mode.

22. The shipping stand, as claimed in claim 18, wherein said maintaining means further includes:

means integral with said maintaining means for indicating whether the shipping stand is configured in the truck transport mode or the air transport mode.

23. The shipping stand, as claimed in claim 18, wherein said maintaining means further includes:

slot means formed on said maintaining means for engaging with said aligning means.

* * * * *

UNITED STATES PATENT AND TRADEMARK OFFICE
CERTIFICATE OF CORRECTION

PATENT NO. : 5,722,512
DATED : 3/3/98
INVENTOR(S) : Gerald D. Lilja, Frank Fowler, Robert F. Hatch It is certified that error appears in the above-indentified patent and that said Letters Patent is hereby corrected as shown below:

ON THE TITLE PAGE :
In the References Cited, U.S. PATENT DOCUMENTS,

Add:   --2,674,370        W.T. Blackinton          206/46--

Signed and Sealed this

Twenty-ninth Day of December, 1998

Attest:

BRUCE LEHMAN

Attesting Officer        Commissioner of Patents and Trademarks